(12) United States Patent
Thill et al.

(10) Patent No.: US 9,179,317 B2
(45) Date of Patent: Nov. 3, 2015

(54) METHOD FOR PREVENTING THE MALICIOUS USE OF A SIM CARD INSERTED IN AN M2M DEVICE AND M2M DEVICE

(75) Inventors: Michel Thill, Meudon (FR); Serge Barbe, Meudon (FR)

(73) Assignee: GEMALTO SA, Meudon (FR)

( * ) Notice: Subject to any disclaimer, the term of this patent is extended or adjusted under 35 U.S.C. 154(b) by 463 days.

(21) Appl. No.: 13/255,914

(22) PCT Filed: Mar. 5, 2010

(86) PCT No.: PCT/EP2010/052826
§ 371 (c)(1),
(2), (4) Date: Sep. 11, 2011

(87) PCT Pub. No.: WO2010/102954
PCT Pub. Date: Sep. 16, 2010

(65) Prior Publication Data
US 2012/0009979 A1    Jan. 12, 2012

(30) Foreign Application Priority Data

Mar. 11, 2009 (EP) .................................... 09305223

(51) Int. Cl.
*H04W 12/12* (2009.01)
*G08B 13/14* (2006.01)
(Continued)

(52) U.S. Cl.
CPC ........... *H04W 12/12* (2013.01); *G08B 13/1418* (2013.01); *G08B 13/1436* (2013.01); *H04L 67/12* (2013.01); *H04W 4/00* (2013.01); *H04W 4/005* (2013.01)

(58) Field of Classification Search
CPC ..... H04W 12/06; H04W 4/001; H04W 4/003; H04W 12/12; H04W 8/04; H04W 8/10; H04W 12/08; H04W 8/265; G06F 21/31; G06F 21/34; G06F 21/88; H04M 15/715
USPC .................................. 455/410, 411, 557, 558
See application file for complete search history.

(56) References Cited

U.S. PATENT DOCUMENTS 6,970,095 B1    11/2005    Lee et al.
7,496,381 B2 *  2/2009    Kim .............................. 455/558
(Continued)

FOREIGN PATENT DOCUMENTS

GB    2329498 A    3/1999
GB    2380356 A    4/2003

OTHER PUBLICATIONS

Anonymous: "3rd Generation Partnership Project: Technical Specification Group Services and System Aspects; Study on Facilitating Machine to Machine Communication in 3GPP-Systems; (Release 7)" TR 22.868 V2.0.1., (3GPP), Feb. 1, 2007, XP050208503 p. 7, para 4.4—p. 8 p. 12, para 5.4.3.
(Continued)

*Primary Examiner* — Liton Miah
(74) *Attorney, Agent, or Firm* — The Jansson Firm; Pehr B. Jansson

(57) ABSTRACT

The invention relates to an M2M device comprising a communication unit and a SIM card, the said SIM card comprising a controller or microcontroller (A), characterized in that the SIM card comprises at least one sensor (B; C), the said at least one sensor being a sensor selected from the group consisting of a temperature sensor, a strain sensor, a movement sensor, a displacement sensor, an inertia or acceleration sensor, a sound sensor, a pressure sensor, an impact sensor and a vibration sensor, the said controller or microcontroller (A) comprising an element for deactivating at least some of its functions following the receipt from the said at least one sensor (B,C) of at least one signal indicating that an environment status value is outside a predetermined range, thus preventing the malicious use of the said SIM card.

25 Claims, 3 Drawing Sheets

(51) Int. Cl.
*H04W 4/00* (2009.01)
*H04L 29/08* (2006.01)

(56) References Cited

U.S. PATENT DOCUMENTS

| 2004/0054921 | A1* | 3/2004 | Land, III | 713/200 |
|---|---|---|---|---|
| 2005/0096088 | A1* | 5/2005 | Bae | 455/558 |
| 2005/0288051 | A1* | 12/2005 | Van Bosch | 455/521 |
| 2006/0105809 | A1* | 5/2006 | Luo | 455/558 |
| 2008/0261561 | A1* | 10/2008 | Gehrmann | 455/411 |
| 2009/0191846 | A1* | 7/2009 | Shi | 455/411 |
| 2009/0221264 | A1* | 9/2009 | Minami et al. | 455/410 |
| 2010/0201393 | A1* | 8/2010 | Quercia et al. | 324/763 |

OTHER PUBLICATIONS

PCT/EP2010/052826, Written Opinion of the International Searching Authority, May 27, 2010, European Patent Office, P.B. 5818 Patentlaan 2 NL—2280 HV Rijswijk.

PCT/EP2010/052826, International Search Report, May 27, 2010, European Patent Office, P.B. 5818 Patentlaan 2 NL—2280 HV Rijswijk.

* cited by examiner

FIG.1
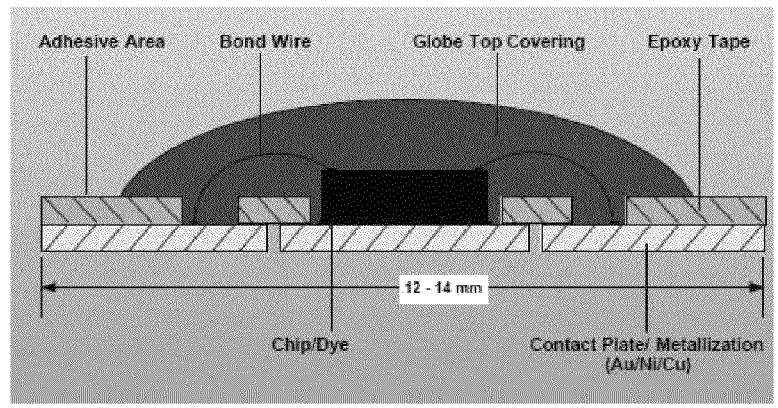
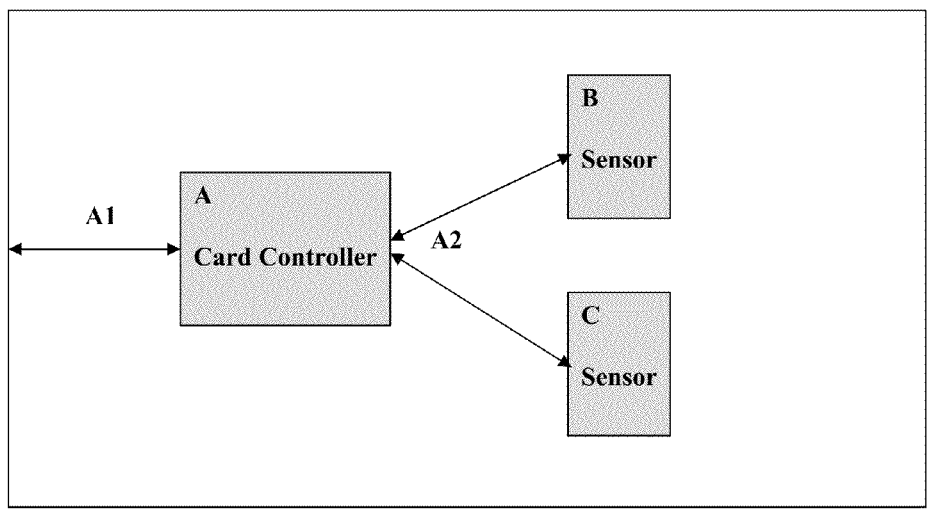
FIG. 2

METHOD FOR PREVENTING THE MALICIOUS USE OF A SIM CARD INSERTED IN AN M2M DEVICE AND M2M DEVICE

BACKGROUND OF THE INVENTION

This invention generally relates to a SIM card for M2M applications and an M2M device.

The term M2M commonly designates "machine to machine communication". For example, M2M technology is designed to allow machines, industrial units, vehicles or generally any piece of equipment to communicate with any other machine, industrial unit, vehicle, device, server or generally any remote piece of equipment, with no human intervention, for example for applications relating to remote surveillance, telemetry, alerts, vehicle fleet management, assistance to persons etc.

Thanks to the growth in wireless communication technology (GSM, GPRS, EDGE, Wi-Fi etc.), M2M has now become an extremely efficient and competitive solution, for instance for managing remote machine bases. Where work in the field was once indispensable for monitoring, controlling or maintaining machines distributed in different locations, the integration of network connectivity and web technologies has made it possible to manage those machines remotely.

As part of the use of wireless telecommunications network(s) such as those of the GSM and GPRS types, the M2M device used typically comprises a communication unit (which in turn comprises means for processing baseband and radiofrequency signals) and a SIM card.

Conventionally, in a wireless communication terminal such as a GSM terminal for example, the SIM card is an external element and is removable from the communication terminal with which it is associated. Indeed, its task is to identify a "subscriber", who may need to change terminals without wanting to change their identifier associated with the SIM card. The card is placed in a space provided in the communication device and is inserted in that space by sliding it into a slot or opening provided for that purpose. It may be changed physically during the life of the communication device, for instance in order to obtain more functions or to change operators.

During the production of SIM cards, in a stage called the personalisation of the SIM card, the SIM card manufacturer puts in place in the SIM card functions that have been required by the operator and stores the parameters of the operator (such as for instance secret keys, encryption algorithms etc.)

As part of M2M applications, communication units are often embedded in equipment and are thus not easily accessible.

M2M devices are devices that may be left without particular human monitoring as they are integrated into equipment or machines that are away from all human presence and are thus liable to undergo degradations aimed at stealing the SIM card in order to reuse the mobile telephone subscription associated with it fraudulently.

SUMMARY

This invention is aimed at remedying those drawbacks of the earlier technique.

To that end, the invention relates to a communicating machine including a SIM card and a SIM card for a communicating machine that comprises a microcontroller, at least one sensor and an element for deactivating at least some of its functions. The SIM card is characterised in that the microcontroller comprises a program for sending a message to a remote server in response to a signal from the sensor that is located outside a predetermined measurement range, the said deactivating element deactivating at least some of the functions of the said controller in response to the receipt of a deactivation message from the remote server.

Preferentially, the said sensor may be a sensor selected from a group consisting of a temperature sensor, a strain sensor, a movement sensor, a displacement sensor, an inertia sensor or an acceleration sensor, a sound sensor, a pressure sensor, an impact sensor and a vibration sensor. The predetermined measurement range may be a range of measurements taken by the sensor in a normal user environment, so that a measurement outside that predetermined measurement range reveals the malicious use of the said SIM card. The deactivating element may use an algorithm for deactivating at least some of the functions of the said controller or microcontroller (A) in response to a plurality of successive signals indicating an environment status value that is outside a predetermined range in order to avoid erroneous deactivation by a false alarm.

The invention also provides a method to prevent the malicious use of a SIM card inserted in a communicating machine by the prior extraction of the said card from the said M2M device, the said SIM card comprising a microcontroller and at least one sensor. The method is characterised in that it comprises at least one measurement by a sensor of a signal representative of the operating environment of the said card, the sending of a message to a remote server in response to a signal from the sensor if the signal is located outside a predetermined measurement range, and the deactivation of at least some of the functions of the SIM card in response to the receipt of a deactivation message from the remote server.

Preferentially, the predetermined measurement range is a range of measurements taken by the sensor in the normal user environment, so that a measurement outside that predetermined measurement range reveals the malicious use of the said SIM card.

Thus, in the invention, the SIM card combines a conventional controller and a sensor, such as a sound sensor, pressure sensor, displacement sensor, impact sensor, temperature sensor, movement sensor or accelerometer. At least one sensor is used depending on the environment in which the M2M device is used, in order to detect a very likely malicious attempt at degradation of the M2M equipment and/or theft of the SIM card. The deactivating element may be software or hardware. It is implemented in the controller or microcontroller, in response to either (1) an alert signal emitted by the sensor, the sensor itself handling in this case the processing required for detecting an alert from an environment status measurement (the environment status may be the temperature, the sound level, a movement etc.) or (2) following processing in the controller (or microcontroller) of an environment status measurement signal received from the sensor. In all cases, the element for deactivating at least some of the functions of the controller or microcontroller is used following the receipt from the sensor of a signal indicating that an environment status value is outside a predetermined range. An environment status may be a pressure, strain or sound level measured by the sensor. If a signal measured by the sensor of the environment status is for example above a limit, it then "brings about" the deactivation of at least some functions of the controller.

The SIM card may also include means for triggering the sending of an alert message, called an "alert" to a server that manages the M2M base (emergency call type) upon receipt from a sensor of a first signal indicating that an environment status value is outside a predetermined range.

The server may be used to query the SIM card in the event of an alert and check the seriousness of the alert, for example to check that the M2M device (comprising the communication unit and the SIM card) is operating correctly. To that end, for example, a provision may be made for analysing whether the causes that have triggered the alert have disappeared or are recurring.

Advantageously, the SIM card may be equipped with at least one circuit designed to check that the SIM object has not been moved and thus diverted from its initial M2M use, such as for instance:

1—For non-mobile M2M systems (meters, vending machines etc.):
  An atmospheric pressure sensor that can detect rapid pressure variations;
  An accelerometer to detect displacements or position changes.

2—For mobile M2M systems (automobiles etc.):
  A circuit for generating signal signatures at the ISO interface between the SIM card and the communication circuit of the M2M device, which signature is characterised by the shape and amplitude of the signals generated by the communication circuit to dialogue with the SIM card.

Other characteristics and benefits of this invention will appear more clearly in the description below, in relation with the corresponding drawings attached, where:

BRIEF DESCRIPTION OF THE DRAWINGS

FIG. 1 is a partial sectional representation of a SIM card module;

FIG. 2 is a schematic block diagram of a SIM card in one mode of embodiment of the invention;

DETAILED DESCRIPTION OF THE INVENTION

According to the invention, the SIM card, for example in the 2FF or 3FF format, advantageously contains a controller or microcontroller and at least one sensor for signalling alerts.

By reference to FIG. 1, the making of a conventional smart card module typically involves first attaching the chip (or microcircuit) with adhesive to the die so that its active side with output contacts are turned up, while attaching its opposite side to a dielectric mounting plate. After that, wire bonding (or soldering of connections) is carried out, consisting of soldering the connections of the output contacts of the chip or microcircuit with the 8-zone contact plate. Lastly, encapsulation in globe top covering is carried out, so as to protect the chip and the connecting wires soldered to it with the help of resin.

In the invention, the SIM card module integrates at least one sensor element or sensor. Thus, in the invention, the sensor is integrated into the module and its interface contacts are connected to the SIM connector through interconnections that are preferably internal to the module, the 8-contact SIM plate being already used by standardised external connections.

By reference to FIG. 2, the architecture presented as an example, in a non-limitative description of the invention includes:

A conventional smart card controller A that contains the SIM application and makes it possible to communicate with the communication unit (which itself comprises means for processing baseband or radiofrequency signals) of the M2M device via one of the interfaces A1 (ISO or USB) defined in the ISO/ETSI recommendation(s). Such communication goes through one of the 8 contact zones of the SIM card. The controller has a second interface A2 that allows communication with one or more sensors B and C in the invention. That interface A2 is for example of the I2C or SPI type and is defined physically by connections internal to the SIM module, offering the possibility of connecting several sensor objects on the same interface.

A sensor is for example a temperature sensor, a pressure sensor, a movement sensor (e.g. accelerometer) or an impact sensor. When a person with malicious intent attempts to steal the SIM card, that creates an impact, a movement or pressure etc. that is detected by the sensor used. That information is sent to the controller A in the form of a signal indicating that an environment status value is outside a predetermined range, which leads to the blocking of all or part of the working of the SIM card, thus prevents at least partly the fraudulent use of the card.

However, unintended blocks of the SIM card may occur as a result of a change in the environment that is independent of a malicious operation.

Figure 3:
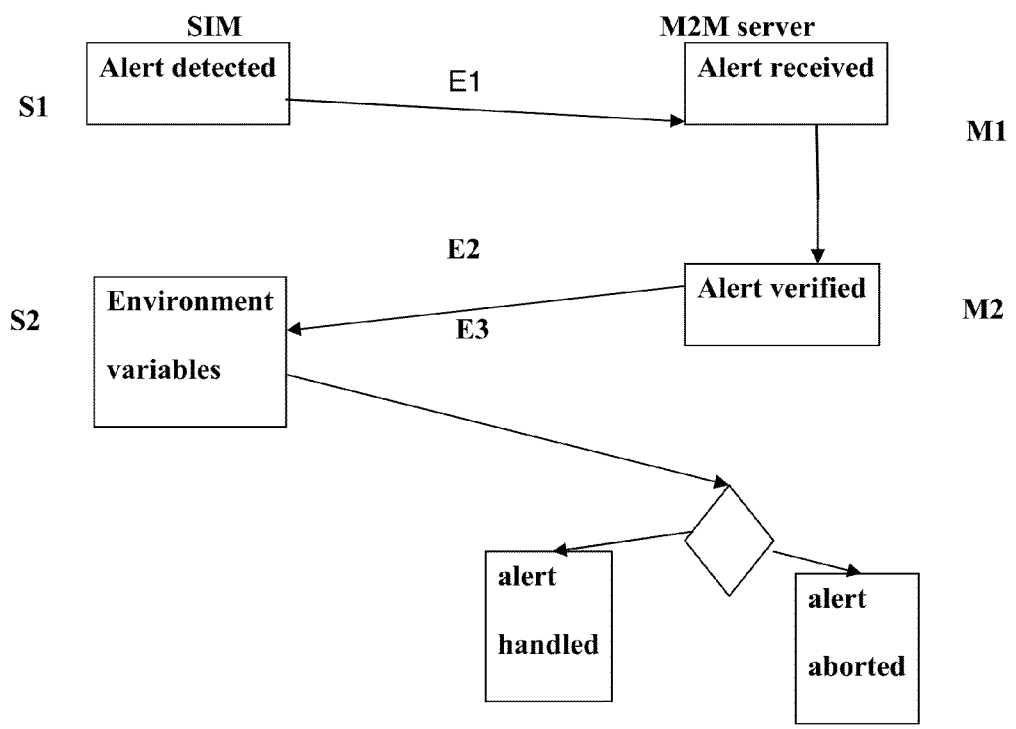
FIG. 3 is the possible sequencing of SIM exchange with a remote server in the event of an alert.

FIG. 3 illustrates another mode of embodiment to remedy that problem, in the form of different stages relating to the detection by the SIM card of a disturbance in its environment.

Initially during S1, the sensor in the SIM card detects a disturbance in its environment, which disturbance may be an impact, an unjustified movement, abnormal temperature etc. A signal indicating that an environment status value is outside a predetermined range is thus sent by the sensor to the SIM card controller. In stage E1, the SIM card controller accordingly builds a message for the server of the M2M application, which message is sent, via the communication unit of the M2M device, to the remote server using conventional technical solutions for mobile telephony communication of the OTA type through messages such as SMS text messages, for example.

The data thus sent by the SIM card (its controller) to the server are of two types:
  Data explicating the alert, for example, abnormal temperature, abnormal impact, and
  Data describing the environment of the SIM card, for example, the signature of the modem, the atmospheric pressure.

In the stage identified as M1, the server receives the alert message sent by the SIM card, and the server then goes into a process of verification of the confirmation of the alert that consists in again querying the SIM card so as to confirm or cancel the alert.

That query is sent by exchange in the stage S2 via the communication unit of the M2M device to the SIM card.

Such querying may be carried out several times at a time interval that may be variable or not, depending on the type of risk to which the M2M device is liable to be exposed.

In stage S2, when the query is received, the SIM card supplies a new report to the server depending on the data received from the sensor contained in it. In that way, the data transmitted by the SIM card to the server during exchange E3 include:
  The alert status (maintained/cleared); and
  The values of the environment variables at the time of the new query.

In stage M3, after one or more repetitive stages (M2, S2), the server goes into the decision-making process where it decides if the alert is ignored or permanently validated.

Thus, in this variant, the controller includes a unit for building a message to the remote server, in response to each of the successive signals indicating an environment status value received from the sensor, the deactivating element deactivating at least some of the functions of the said controller in response to the receipt of a deactivating message from the remote server.

Of course, when a query from the server to the SIM card goes unanswered, the alert is automatically validated.

Alternatively, a process for deciding to validate the alert may be applied by the SIM card alone. For example, in the case of a SIM card that is used in non-mobile M2M equipment, the fact that the SIM card detects a movement from the accelerometer several times can be evaluated by the SIM card as a serious alert and therefore the controller in the SIM card may itself take the decision to block operation. In this case therefore, the deactivating element in the controller of the SIM card implements an algorithm for deactivating at least some of the functions of the said controller or microcontroller, only in response to a plurality of successive signals indicating that an environment status value is outside a predetermined range, in order to prevent incorrect deactivation due to a false alarm. Thus for example, the algorithm counts the number of successive signals indicating that an environment status value is outside a predetermined range within a given time interval, triggering in the deactivating element the deactivation of at least some of the functions of the controller.

Figure 4:
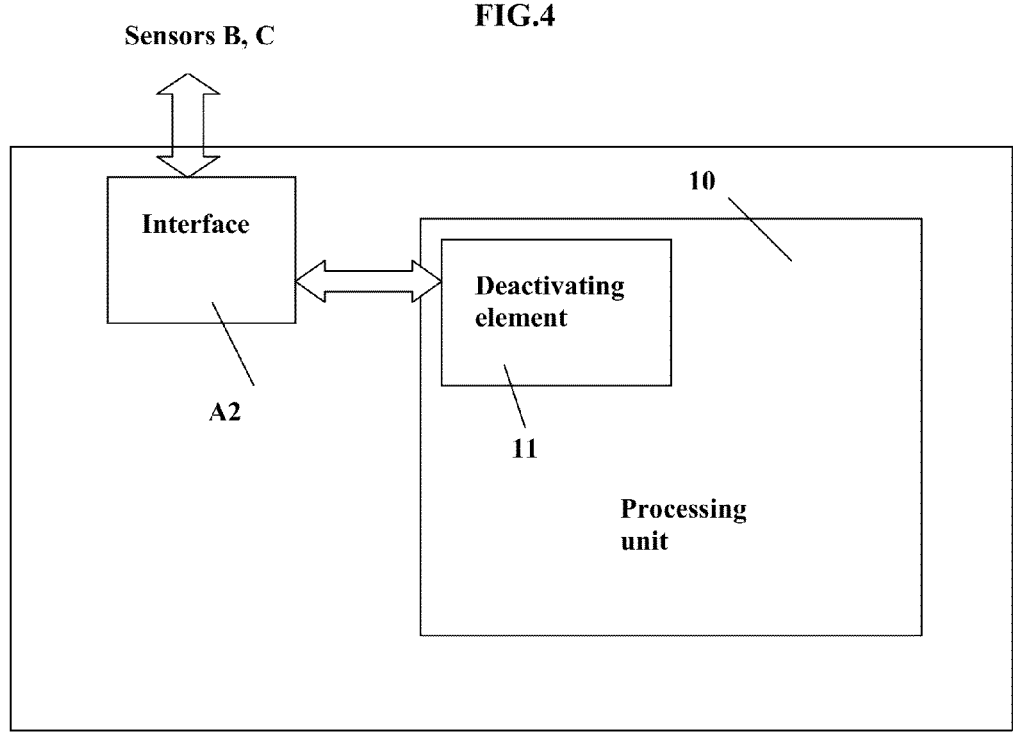
FIG. 4 is a block diagram of the controller in the invention.

By reference to FIG. 4, the controller or microcontroller of the SIM card in the invention comprises a conventional processing unit 10 with which is associated, or in which is included a hardware or software deactivating element 11. That deactivating element receives signals indicating an environment status value generated by the sensor B, C from the interface A2 with the sensor B, C. Alternatively, in another variant of the invention, that deactivating element receives a deactivating message from the remote server.

The invention claimed is:

1. A machine comprising a communication unit and a Subscriber Identification Module (SIM) card, which SIM card comprises a microcontroller (A), at least one sensor (B; C), and an element for deactivating at least some of its functions, wherein the microcontroller comprises a program for sending an alert message reporting an abnormal measurement to a remote server in response to an alert indicative of a signal from the sensor located outside a predetermined measurement range, the deactivating element deactivating at least some functions of the controller in response to the receipt of a deactivating message from the remote server.

2. The machine according to claim 1, in which the at least one sensor is a sensor selected from the group consisting of a temperature sensor, a strain sensor, a movement sensor, a displacement sensor, an inertia or acceleration sensor, a sound sensor, a pressure sensor, an impact sensor and a vibration sensor.

3. The machine according to claim 1, in which the predetermined measurement range is a range of measurements taken by the sensor in the normal user environment, so that a measurement outside that predetermined measurement range reveals malicious use of the SIM card.

4. The machine according to claim 1, in which the deactivation element uses an algorithm deactivating at least some functions of the controller or microcontroller in response to a plurality of successive signals indicating an environment status value outside a predetermined range in order to prevent erroneous deactivation due to a false alarm.

5. The machine according to claim 1, wherein the message to a remote server comprises data explicating the alert.

6. The machine according to claim 1, wherein the message to a remote server comprises data describing the environment of the SIM card.

7. The machine according to claim 1, the program further operable to receive a query transmitted by the remote server to verify the alert indicative of a signal from the sensor located outside a predetermined measurement range.

8. The machine according to claim 7, the program further operable to respond to the query transmitted by the remote server to verify the alert by supplying the server with a report depending on new data received from the sensor.

9. The machine according to claim 8, wherein the report depending on new data received from these sensor comprises alert status as maintained or cleared and updated values of environmental variables.

10. A method for preventing the malicious use of a Subscriber Identification Module (SIM) card inserted in a communication machine by the prior extraction of the said card from the communication machine device, the SIM card comprising a microcontroller and at least one sensor, wherein the method comprises at least one measurement by a sensor of a signal representing the operating environment of the card, the sending of an alert message reporting an abnormal measurement to a remote server in response to an alert indicative of the signal from the sensor if the signal is located outside a predetermined measurement range and the deactivation of at least some of the functions of the SIM card in response to the receipt of a deactivating message from the remote server.

11. The method according to claim 10, in which the predetermined measurement range is a range of measurements taken by the sensor in a normal user environment, so that a measurement outside that predetermined measurement range reveals malicious use of the SIM card.

12. The method according to claim 10, wherein the message to a remote server comprises data explicating the alert.

13. The method according to claim 10, wherein the message to a remote server comprises data describing the environment of the SIM card.

14. The method according to claim 10, further comprising receiving a query transmitted by the remote server to verify the alert indicative of a signal from the sensor located outside a predetermined measurement range.

15. The method according to claim 14, further comprising responding to the query transmitted by the remote server to verify the alert by supplying the server with a report depending on new data received from the sensor.

16. The method according to claim 15, wherein the report depending on new data received from these sensor comprises alert status as maintained or cleared and updated values of environmental variables.

17. A Subscriber Identification Module (SIM) card designed to be embedded in a communicating machine, the SIM card comprising a microcontroller, at least one sensor, and an element for deactivating at least some of its functions, wherein the microcontroller comprises a program for sending an alert message reporting an abnormal measurement to a remote server in response to an alert indicative of a signal from the sensor that is located outside a predetermined measurement range, the deactivating element deactivating at least some functions of the controller in response to the receipt of a message deactivating the remote server.

18. The Subscriber Identification Module (SIM) card according to claim 17, in which the at least one sensor is a sensor selected from the group consisting of a temperature sensor, a strain sensor, a movement sensor, a displacement sensor, an inertia or acceleration sensor, a sound sensor, a pressure sensor, an impact sensor and a vibration sensor.

19. The Subscriber Identification Module (SIM) card according to claim 18, in which the predetermined measurement range is a range of measurements taken by the sensor in a normal user environment, so that a measurement outside that predetermined measurement range reveals malicious use of the said SIM card.

20. The Subscriber Identification Module (SIM) card according to claim 19, in which the deactivating element implements an algorithm for deactivating at least some of the functions of the said controller or microcontroller (A) in response to a plurality of successive signals that indicate that an environment status value is outside a predetermined range in order to prevent erroneous deactivation due to a false alarm.

21. The Subscriber Identification Module (SIM) card according to claim 17 wherein the message to a remote server comprises data explicating the alert.

22. The Subscriber Identification Module (SIM) card according to claim 17 data describing the environment of the SIM card.

23. The Subscriber Identification Module (SIM) card according to claim 17, the program further operable to receive a query transmitted by the remote server to verify the alert indicative of a signal from the sensor located outside a predetermined measurement range.

24. The Subscriber Identification Module (SIM) card according to claim 23, the program further operable to respond to the query transmitted by the remote server to verify the alert by supplying the server with a report depending on new data received from the sensor.

25. The Subscriber Identification Module (SIM) card according to claim 24, wherein the report depending on new data received from these sensor comprises alert status as maintained or cleared and updated values of environmental variables.

* * * * *